(12) United States Patent
Gargano et al.

(10) Patent No.: US 10,525,892 B2
(45) Date of Patent: Jan. 7, 2020

(54) IN-VEHICLE LOCKING SAFE WITH DETACHMENT AND BREACH RESISTANT SECURITY FEATURES

(71) Applicant: Faraday & Future Inc., Gardena, CA (US)

(72) Inventors: Jared L Gargano, Costa Mesa, CA (US); Pontus Anthony Fontaeus, Newport Beach, CA (US); Richard S Kim, Los Angeles, CA (US); Juergen W Sauer, Denkendorf OT Gelbelsee (DE); Claudio Carbone, Los Angeles, CA (US); Skyler Reed Lund, La Crescenta, CA (US)

(73) Assignee: FARADAY & FUTURE INC., Gardena, CA (US)

(*) Notice: Subject to any disclaimer, the term of this patent is extended or adjusted under 35 U.S.C. 154(b) by 0 days.

(21) Appl. No.: 15/658,281

(22) Filed: Jul. 24, 2017

(65) Prior Publication Data
US 2019/0152401 A1 May 23, 2019

Related U.S. Application Data

(60) Provisional application No. 62/365,938, filed on Jul. 22, 2016.

(51) Int. Cl.
| | | |
|---|---|---|
| *B60R 7/04* | (2006.01) | |
| *E05G 1/00* | (2006.01) | |
| *E05B 65/00* | (2006.01) | |
| *G07C 9/00* | (2006.01) | |
| *B60R 7/08* | (2006.01) | |
| *E05B 51/00* | (2006.01) | |
| *E05B 37/00* | (2006.01) | |

(52) U.S. Cl.
CPC ............. *B60R 7/04* (2013.01); *B60R 7/043* (2013.01); *B60R 7/087* (2013.01); *E05B 65/0075* (2013.01); *E05G 1/005* (2013.01); *G07C 9/00912* (2013.01); *E05B 37/0072* (2013.01); *E05B 51/00* (2013.01); *E05Y 2900/50* (2013.01); *G07C 9/00563* (2013.01)

(58) Field of Classification Search
CPC ........... B60R 7/04; B60R 7/043; E05G 1/005; G07C 9/00912; E05B 37/0072; E05B 51/00; E05B 65/0075
See application file for complete search history.

(56) References Cited

U.S. PATENT DOCUMENTS

3,305,266 A * 2/1967 Nicholas ................. B60R 22/22
297/482
9,169,685 B2 * 10/2015 Larson ................. E05B 17/0062
(Continued)

*Primary Examiner* — Lori L Lyjak (57) ABSTRACT

An in-vehicle locking safe system comprising a lockbox having one or more walls defining an enclosure, wherein the lockbox is configured with one or more apertures in one or more lockbox walls. The in-vehicle locking safe system further comprises a vehicle structural element including one or more studs configured to be inserted within one or more apertures in one or more lockbox walls, and a fastener component coupled to a portion of the one or more studs at a location inside the enclosure of the lockbox. In some embodiments, the vehicle structural element includes one or more of a vehicle chassis, a slider rail, a slider track, and/or a floor layer.

18 Claims, 8 Drawing Sheets

(56) References Cited

U.S. PATENT DOCUMENTS

| | | | | |
|---|---|---|---|---|
| 9,316,039 | B2* | 4/2016 | Stevenson | E05B 47/00 |
| 2002/0157497 | A1* | 10/2002 | Porter | G05G 1/405 |
| | | | | 74/512 |
| 2007/0241584 | A1* | 10/2007 | Williamson | B60R 7/043 |
| | | | | 296/95.1 |
| 2007/0248436 | A1* | 10/2007 | Sano | B62D 25/2072 |
| | | | | 411/175 |
| 2009/0096272 | A1* | 4/2009 | Okano | B60N 2/995 |
| | | | | 297/423.3 |
| 2010/0308604 | A1* | 12/2010 | Pauken | B60R 7/043 |
| | | | | 292/169.14 |
| 2013/0015643 | A1* | 1/2013 | Gorman | B60R 21/207 |
| | | | | 280/730.2 |
| 2013/0055933 | A1* | 3/2013 | Markman | E05G 1/005 |
| | | | | 109/50 |
| 2016/0144857 | A1* | 5/2016 | Ohshima | G05D 1/0061 |
| | | | | 701/23 |
| 2016/0238337 | A1* | 8/2016 | Hull | B60R 7/14 |
| 2016/0339807 | A1* | 11/2016 | Mizuno | B60N 2/01 |
| 2017/0114569 | A1* | 4/2017 | Kleinjan | E05B 17/10 |
| 2017/0232871 | A1* | 8/2017 | Asai | B60N 2/16 |
| | | | | 297/344.15 |
| 2017/0368999 | A1* | 12/2017 | Rueda | E05B 65/0075 |
| 2018/0099595 | A1* | 4/2018 | Kondrad | B60N 2/929 |
| 2018/0108192 | A1* | 4/2018 | Ho | H04L 12/282 |

* cited by examiner

IN-VEHICLE LOCKING SAFE WITH DETACHMENT AND BREACH RESISTANT SECURITY FEATURES

CROSS-REFERENCE TO RELATED APPLICATIONS

This application claims the benefit of U.S. Provisional Application No. 62/365,938, filed Jul. 22, 2016, the entirety of which is hereby incorporated by reference.

TECHNICAL FIELD

The present disclosure relates generally to in-vehicle locking safe systems for protecting valuables, and more particularly to systems, methods, and apparatus for in-vehicle locking safes with added protection features to resist detachment and breach attempts.

BACKGROUND OF THE DISCLOSURE

Some vehicles are equipped with locking compartments or locking safes to store valuables. These locking safes are traditionally located within a console of the vehicle (e.g. center console, trunk console) or a glovebox compartment. Such conventional locking safe systems can easily be removed, detached, or stolen from the vehicle. Thus, although the locking and protection systems of conventional in-vehicle locking safes provide some protection, they can be readily removed, dislodged, or otherwise detached from the vehicle to be later breached or opened at another place and/or time. In view of these drawbacks, the present disclosure provides systems, methods and apparatus for providing an in-vehicle locking safe system with novel detachment resistant and/or breach resistant security features.

BRIEF DESCRIPTION OF THE DRAWINGS

Various embodiments are disclosed herein and described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

BRIEF SUMMARY OF THE DISCLOSURE

The present disclosure relates to an in-vehicle locking safe system used to more securely store and protect valuables in a vehicle. In some embodiments, the in-vehicle locking safe system includes a lockbox having one or more walls defining an enclosure, wherein the lockbox is configured with one or more apertures through one or more lockbox walls. The in-vehicle locking safe system further includes a vehicle structural element having one or more studs configured to be insertable within and/or through one or more of the apertures configured in one or more of the lockbox walls, and a fastener component coupled to a portion of the one or more studs at a location inside the enclosure of the lockbox. In some embodiments, the vehicle structural element includes one or more of a vehicle chassis, a slider rail, a slider track, and/or a flooring layer. In some embodiments, an in-vehicle locking safe system can have a low security mode, wherein the lockbox contents are protected by a vehicle component, such as an ottoman, and a high security mode, wherein the lockbox contents are protected by both a vehicle component and the lockbox enclosure.

DETAILED DESCRIPTION

Figure 1:
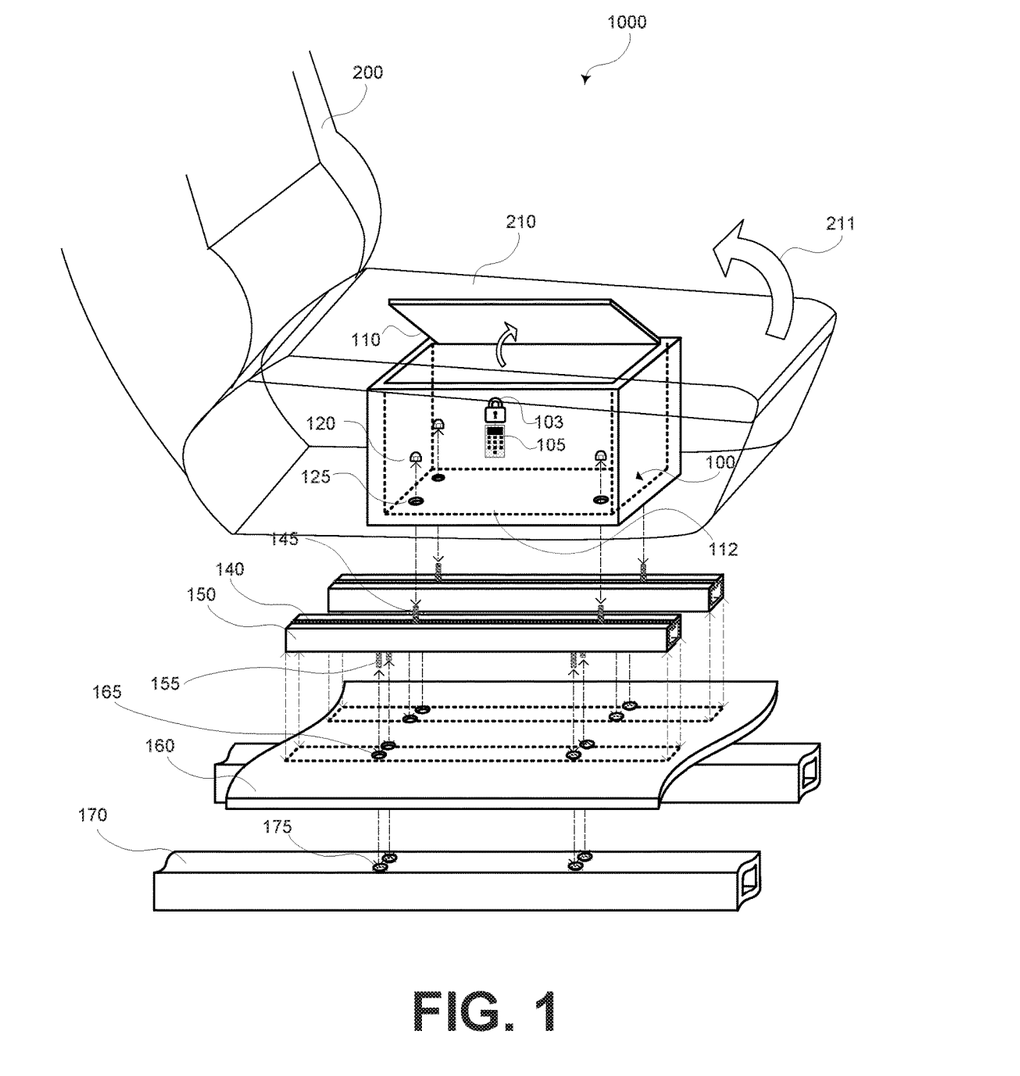
FIG. 1 illustrates an exploded view of an in-vehicle locking safe system 1000 in accordance with one or more embodiments of the present disclosure.

FIG. 1 illustrates an in-vehicle locking safe system 1000 in accordance with one or more embodiments of the present disclosure. As depicted, in some embodiments, in-vehicle locking safe system 1000 may include a lockbox 100 coupled (directly or indirectly) to a vehicle structural element 170 of a vehicle (e.g. chassis, floor, undercarriage, etc.) via one or more fastening component(s) (e.g. nut(s) 120, stud(s) 145, stud(s) 155, etc.). The lockbox 100 is configured with one or more aperture(s) 125 proceeding through one or more of its wall(s) (e.g. the bottom wall 112). A first end of the at least one fastening component(s) (e.g., as depicted, a threaded stud 145) may proceed into and/or pass through one or more of the aperture(s) to join and/or mate with a complementary fastening component/feature (e.g., as depicted, a complementarily threaded nut 120) in an enclosure of lockbox 100. A second end of the fastening component(s) (e.g., as depicted, a threaded stud 145) may be attached to the vehicle structure element 170.

In some embodiments, properly engaging or disengaging the fastening component(s) 145, 120 requires access to/through the enclosure of the lockbox 100, and in such instances, proper access to the enclosure of lockbox 100 may occur only by traversing a password/passcode-protected barrier 110 (e.g. a lid, a door, a gate, etc.) of the lockbox 100. In other words, in the exemplary embodiments, the fastening component(s), e.g., 120, are accessible only through the inside of the enclosure of the lockbox 100. Other coupling mechanisms/features/fastening components (or portions thereof) may be concealed and/or embedded within one or more other vehicle features so as not to be accessible to an intruder's attempts to detach and/or steal the lockbox. As such, in some embodiments of the present technology, detaching/removing the lockbox from the vehicle is made at least as difficult as breaching/breaking into the lockbox enclosure itself, and in many instances, more timely and difficult. In embodiments, lockbox 100 cannot be practically, properly, and/or quickly removed or detached from the vehicle to which it is coupled without accessing the fastening components on the interior of said lockbox 100, so an intruders' ability to detach and steal the lockbox for later breach is drastically undermined in comparison to conventional locking safes.

Lockbox 100 may include any type of safe or lockbox unit (including those commonly known in the art) having an enclosure configured to secure and hold valuables. In some embodiments, lockbox 100 includes one or more walls (which may be individually or collectively planar or curvilinear) that create an enclosure (or partial enclosure). The enclosure may include a removable/moveable/openable barrier 110 (e.g., lid) configured to cover an opening of the enclosure; the removability/movability of such barrier providing the means of proper entry into the enclosure of the lockbox 100. Proper entry may in some instances include providing an accurate password or passcode or other specified authentication information (e.g. fingerprint, retinal scan, facial recognition, a smart key, etc.) to unlock the lock mechanism 103. As depicted, lockbox 100 may be configured to be embedded/concealed within an interior portion of a car seat 200 (e.g. within/under the seat cushion 210, within/under the seat support frame, etc.), hiding the lockbox by disguising/concealing it within a common component of a car cabin (e.g. a passenger seat 200). Arrow 211 of FIG. 1 symbolically depicts that, in some embodiments, the seat cushion 210 may pivot or otherwise be removed or moved in a manner that exposes the barrier 110 to the lockbox 100. Thus, a user may move/remove the seat cushion 210 to access the lockbox, then proceed to unlock the barrier with the required information. Although depicted in FIG. 1 as being contained within/under car seat 200, it should be recognized that the lockbox 100 may be configured to be contained within/under any other feature of a car, or provided as a standalone unit that may or may not also function in other capacities (e.g. a leg rest, a cup holder, etc.). It should further be noted that the materials used to form the enclosure of lockbox 100 may include any materials, including those commonly known in the art. Such materials may be rigid, shatterproof, fireproof, water-resistant, electrically neutral and/or nonconducting, bulletproof, etc.

As shown, the lockbox 100 may be indirectly coupled to vehicle structural element 170. Structural element 170 may be, e.g., a portion of the vehicle's chassis, frame, unibody, undercarriage, floorboard barrier and/or the like. Although in some embodiments a stud may be integrally formed with the structural element 170 and extend directly up through the aperture(s) 125 of lockbox 100, in many other embodiments there may be other layers and/or components between the structural element 170 and the lockbox 100. These layers and/or components may be used as part of the concealed coupling assembly of the in-vehicle locking safe system 1000. For example, as depicted, in some embodiments in-vehicle locking safe system 1000 includes one or more slider rail(s) 140 coupled to or otherwise engaged with slider track 150; the slider rail 140 includes one or more stud(s) 145 integrally formed therein and configured to proceed into and/or through aperture(s) 125 to mate with one or more fastener component(s) 120 (e.g. to secure lockbox 100 thereto); the slider track 150 (e.g. an open channel) configured to embrace and or slideably engage the slider rail 140, and further configured to be coupled to a vehicle structural component 170 (in some embodiments, traversing through floor layer 160) via one or more stud(s) configured therewith. In other embodiments (not shown in FIG. 1), the lockbox 100 may be directly coupled to structural element 170.

As shown, fastening component(s) may include one or more of a stud 145 (threaded or unthreaded), a stud 155 (threaded or unthreaded), a nut 120, a weld (not shown), a snap-fit or clamp-fit mechanism, or any other temporary or permanent fastening mechanism known in the art. In some embodiments, a stud 145 has a first end and a second end, wherein the first end is configured to proceed into and/or pass through one or more of the aperture(s) 125 of lockbox 100 to join and/or mate with a complementary fastening component/feature (e.g., as depicted, a complementarily threaded nut 120) in an enclosure of lockbox 100, and the second end is attached to slider rail 140 (e.g. welded thereto, etc.). In some embodiments, a stud 155 has a first end and a second end, wherein the first end is configured to proceed into and/or pass through one or more of the aperture(s) 165, 175 in one or more of the floor layer 160 and/or the vehicle structural component 170 to join and/or mate with a complementary fastening component/feature to interlock the stud (and everything coupled thereto) to the vehicle structural component 170 in a concealed manner. For example, stud 155 may be a threaded stud that fits through aperture 175 of slider track 170 and couples to a complementary threaded nut within the enclosure of a square tube (e.g. 170). Such nut(s) and/or other operable features of fastening components are hidden and concealed within the structural elements of the vehicle, and therefore are not readily accessible to a thief or other intruder seeking to steal/detach/remove the lockbox 100. In other embodiments, other coupling mechanisms/features/fastening components (or portions thereof), including any known in the art, may be deployed in accordance with the technology disclosed herein, in a manner that conceals and/or embeds operable portions of the vehicle structural component 170 within one or more other vehicle constituents so as not to be accessible to an intruder's attempts to detach and/or steal the lockbox 100.

As depicted, accessing the enclosure of the lockbox 100 requires traversing a password/passcode-protected barrier 110. Barrier 110 may be a lid, a door, a gate, or other barrier (or arrangement of components) coupled to, operable with, or integrated with the lockbox 100, and restricting access thereto. The barrier 110 may open in any one or more directions. For example, although the lid is depicted in FIG. 1 as being hinged at a side of the lockbox 100 near a left side of the seat (when facing forward) and opening from a side of the lockbox 100 near a right side of the seat (when facing forward), the lid may be configured to open from any side or location (e.g. near the front side of the seat, near the back side of the seat, near a bottom of the seat, etc.). Although barrier 110 is depicted in FIG. 1 (and FIG. 2A) as a lid opening in an upward direction, one of ordinary skill in the art will readily recognize that there are several other variations and/or modifications of such barriers that will fall within the scope of the present disclosure. For example, the barrier may be created by a separate structural unit that can in some instances cover any openings in the enclosure that comprises the lockbox 100 (e.g. where the lockbox is configured like an openable drawer, and the barrier 110 may be the housing structure/receptacle surrounding an opening of the lockbox 100 enclosure when in a closed configuration (See FIG. 3B).

The password and/or passcode protection mechanism (e.g. lock 103) operatively coupled with lockbox 100 (i.e. between/with barrier 110 and the remainder of the enclosure that comprises lockbox 100) may include a digital padlock, a physical keyed lock, a combination lock, a mortise lock, an electronic lock, etc., and/or any other locking mechanism known in the art. Lock 103 may be any type or style of lock, and may be accessible in any acceptable manner. For example, the lock may be unlocked/made accessible by moving one or more dials into a particular configuration, selecting one or more numbers/letters in a specific pattern on an operatively coupled keypad (e.g. including physical and/or virtual keypads, connected through a hardware connection, a wired and/or wireless connection, and the like). In some embodiments, the in vehicle locking safe 1000's locking mechanism requires a two-step verification process (e.g. RSA, dynamic authentication codes). Some embodiments include a non-numeric input from a user to unlock the lock. For example, locking mechanism 103 and/or 105 may require a biometric scan based on physiological or behavioral characteristics, including face, fingerprint, hand geometry, handwriting, iris, retinal, vein, and voice, or any other locking/unlocking/authentication mechanism known in the art.

As indicated, in some such embodiments of the present disclosure, detaching/removing the lockbox from the vehicle is made at least as difficult as breaching/breaking into the lockbox enclosure itself, and in many instances more difficult. In particular, lockbox 100 cannot practically be removed/detached from the vehicle to which it is coupled without accessing the fastening components on the interior of said lockbox 100, so an intruder's ability to detach and steal the lockbox for later breach is drastically undermined in comparison to conventional in-vehicle safes.

Figure 2:
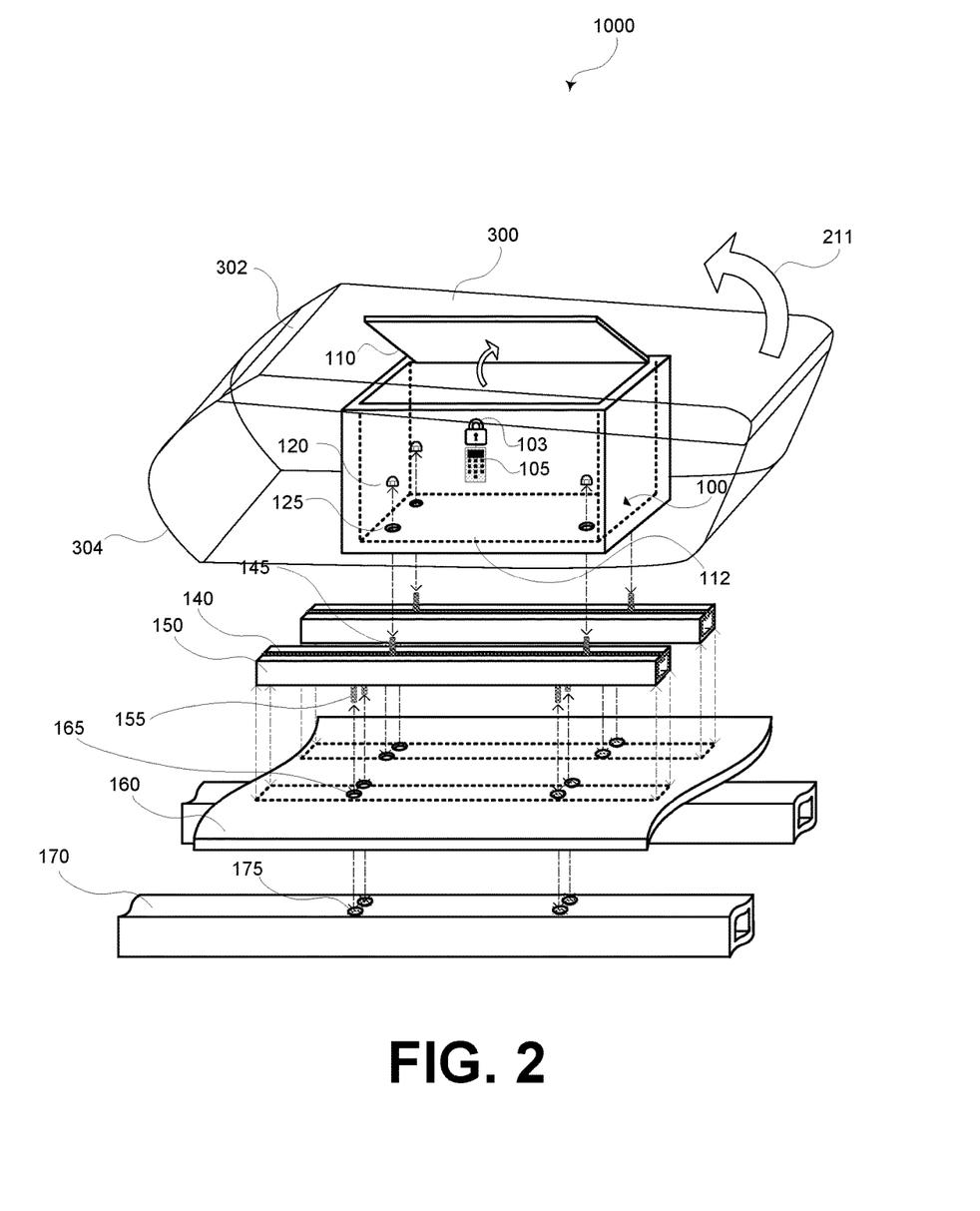
FIG. 2 illustrates an exploded view of an exemplary in-vehicle locking safe system 1000 in accordance with one or more embodiments of the present disclosure.

FIG. 2 illustrates an exemplary in-vehicle locking safe system 1000 in accordance with one or more embodiments of the present disclosure. As depicted, in some embodiments in-vehicle locking safe system 1000 may include a lockbox 100 nested within an ottoman unit 300 within a car; the lockbox 100 being coupled (directly or indirectly) to a vehicle structural element 170 of a vehicle (e.g. chassis, floor, undercarriage element, etc.) via one or more fastening component(s) (e.g. nut(s) 120, stud(s) 145, stud(s) 155, etc.). The lockbox 100 may be configured with one or more aperture(s) 125 proceeding into or through one or more of its wall(s) (e.g. the bottom wall 112) or other support elements, and at least one end of the at least one fastening component (s) (e.g., as depicted, a threaded stud 145) may proceed into and/or pass through one or more of the aperture(s) to join and/or mate with a complementary fastening component/feature (e.g., as depicted, a complementarily threaded nut 120) within an enclosure of lockbox 100.

In some instances, the aperture(s) 125 of the lockbox 100 will be counter-bored on an interior side of the aperture. For purposes of this disclosure, the space provided by the counter-bored portion of the aperture may be considered part of the enclosure of the lockbox 100. Thus, although when tightened upon stud 145, nut 120 may nestle at least partially within the counter bore (e.g. situated within an area otherwise defined by the thickness of the given wall), the fastening component 120 may nevertheless still be considered to be inside lockbox 100's enclosure. In any case, the fastening component 120 is inaccessible from an exterior side of the lockbox 100 without first proceeding through an interior portion, access to which is restricted by barrier 110. That is, as noted previously, in some embodiments, properly engaging or disengaging the fastening component(s) 145, 120 requires access to/through the interior of the lockbox 100, and in such instances, proper access to said interior of the lockbox 100 may occur only by traversing a password/passcode-protected barrier 110 (e.g. a lid, a door, a gate, etc.) of the lockbox 100.

Other coupling mechanisms/features/fastening components (or portions thereof) used to secure lockbox 100 to the vehicle may be concealed and/or embedded within one or more other vehicle structural or peripheral features so as not to be accessible to an intruder's attempts to detach and/or steal the lockbox. As such, in some embodiments of the present technology, detaching/removing the lockbox from the vehicle is made at least as difficult as breaching/breaking into the lockbox enclosure itself, and in many instances, more difficult. In particular, lockbox 100 cannot practically be removed/detached from the vehicle to which it is coupled without accessing the fastening components on the interior of said lockbox 100, so an intruders' ability to detach and steal the lockbox for later breach is drastically undermined in comparison to conventional safes.

As described herein, lockbox 100 may include any type of safe or lockbox (including those commonly known in the art) having an enclosure configured to secure and hold valuables. In some embodiments lockbox 100 is comprised of one or more walls (which may be individually or collectively planar or curvilinear) that create an enclosure (or partial enclosure). The enclosure may be configured with a removable/moveable/openable barrier 110 (e.g., lid) configured to cover an opening of the enclosure, the removability/movability of such barrier providing the means of proper entry into the enclosure of the lockbox 100. Proper entry may, in some instances, include providing a unique password or passcode or other specified authentication information (e.g. fingerprint, retinal scan, etc.) to unlock the lock mechanism 103.

As depicted, lockbox 100 may be configured to be embedded/concealed within an interior portion of an in-vehicle ottoman unit 300, thus hiding the lockbox by disguising/concealing it within a common component of a car cabin (e.g. a passenger seat 200). Arrow 311 of FIG. 2 symbolically depicts that, in some embodiments, a top portion of ottoman 300 may pivot or otherwise be removed or moved in a manner that exposes the barrier 110 (e.g. lid) of the lockbox 100. Thus, a user may move/remove the top portion of ottoman 300 to access the lockbox, then proceed to unlock the barrier with the required information. Although the top portion of ottoman 300 is depicted (by arrow 311) in FIG. 2 as being movable in a hinged/rotatable fashion for the user to obtain access to the lockbox 100, it should be noted that access to the lockbox 100 through the housing or structure of the ottoman 300 may occur in any manner. For example, any one or more of the ottoman walls, or portions thereof (e.g. 302, 304) may be rotatably, translatably, or otherwise movably coupled to the remainder of the ottoman 300 in a manner that allows a user to access the locking mechanism 103, 105 and barrier 110 entrance of the lockbox 100. It should further be noted that any such similar mechanisms (noted above or anywhere else in the instant disclosure may be employed in an analogous fashion to the barrier 110 with respect to the remainder of the lockbox 100. That is, any one or more of the lockbox 100 walls, or portions thereof (e.g. 302, 304) may be used as a barrier 110 and be rotatably, translatably, or otherwise movably coupled to the remainder of the lockbox 100 structure in a manner that allows a user to access the interior of the lockbox 100 by operating the barrier in such a fashion.

Figure 3:
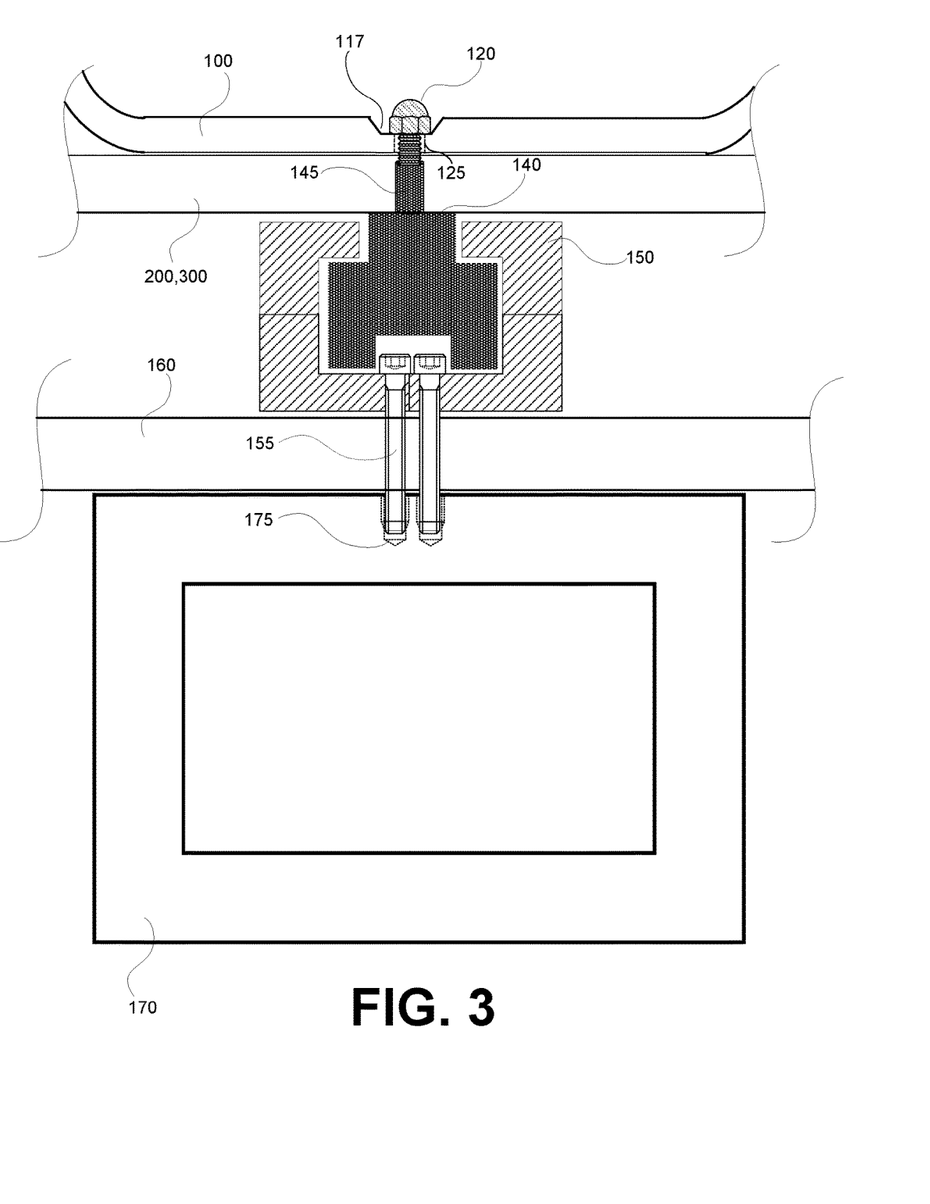
FIG. 3 illustrates a cross-sectional view of a coupling configuration/assembly of an exemplary in-vehicle locking safe system in accordance with one or more embodiments of the present disclosure.

As shown, the lockbox 100 may be indirectly coupled to vehicle structural element 170. Structural element 170 may be, e.g., a portion of the vehicle's chassis, frame, unibody, undercarriage, floorboard barrier and/or the like. Although in some embodiments a stud may be integrally formed with the structural element 170 and extend directly up through the aperture(s) 125 of lockbox 100, in many other embodiments there are other layers and/or components between the structural element 170 and the lockbox 100. These layers and/or components may be used as part of the concealed coupling assembly of the in-vehicle locking safe system 1000. FIG. 3 depicts one such exemplary arrangement.

FIG. 3 illustrates a cross-sectional view of a coupling configuration/assembly of an exemplary in-vehicle locking safe system in accordance with one or more embodiments of the present disclosure. As depicted, in some embodiments in-vehicle locking safe system 1000 may include a slider rail 140 coupled to or otherwise engaged/nested with slider track 150; the slider rail 140 includes one or more stud(s) 145 configured to proceed into and/or through aperture(s) 125 in a bottom wall portion of lockbox 100 to mate with one or more fastener component(s) 120 (e.g. to secure lockbox 100 thereto).

As depicted, stud 145 may also pass through other layers of material between the slider rail 140 and the lockbox 100, such as, e.g., the framework of a car seat 200, the housing of an ottoman 300, and/or the like. As further shown, when fastened, fastener component(s) 120 such as the nut depicted in FIG. 3 may be at least partially nested/situated within a counterbored portion 117 of lockbox 100. In embodiments where slider rails 140 and/or slider tracks 150 are employed within in-vehicle locking safe system 1000, slider track 150 (e.g. an open channel) may be configured to embrace and or slideably engage the slider rail 140. That is, in operation, the lockbox 100 assembly may be made to move/slide along the length of slider track 150 when sufficient force is applied (e.g. in a direction orthogonal to the plane of the cross-section depicted). As further depicted, in such embodiments slider track 150 may be configured to be coupled to a vehicle structural component 170 (in some embodiments, traversing through other layers, e.g. flooring layer 160) via one or more stud(s) 155. Studs 145 and 155 may be bolts, rivets, screws, posts (e.g. posts that are welded to or integrally formed with slider track 150 or structural element 170). In some embodiments, studs 145 and 155 may have a metal head at one end and threads at the other end. In some other embodiments, studs 145 and 155 may have a stud bolt with threads at two ends for engaging with two nuts.

Although studs 155 are depicted in FIG. 3 as threaded bolts with a first end (the head) situated in the channel of slider track 150 and the shoulder and/or shaft proceeding into/through one or more apertures in a side wall of slider track 150 and further into a threaded receptacle 175 of structural component 170 (e.g. formed from tapped steel, or the like), a reverse arrangement (not shown) may also be employed. That is, where similar threaded bolts are employed, the first end (the head) may be situated/or otherwise embedded in structural component 170 (or a channel/aperture within structural component 170) and the shoulder and/or shaft may proceed into/through one or more apertures in a side wall of structural component 170 and further into a threaded receptacle (e.g. a fastener component such as fastener component 120, and the like) coupled to or held within a channel of slider track 150.

One of ordinary skill in the art will appreciate that other arrangements and/or modifications may be employed without departing from the scope and spirit of the present disclosure. Some such exemplary arrangements may be employed such that one or more ends of a coupling stud or post are coupled to and/or concealed within one or more of a side wall or aperture/channel defined by the structure of: a vehicle structural component 170, a slider track 150, a slider rail 140, and/or lockbox 100 housing. Further, some exemplary arrangements may be employed such that one or more other portions of a coupling stud or post (e.g. the shoulder or shaft of a bolt) are coupled to and/or concealed by/within the structure of: a flooring layer 160, a material layer of car seat 200 or ottoman 300, other vehicle structural components 170, slider tracks 150, slider rails 140, and/or lockbox 100 housing. In other embodiments (not shown in FIG. 1), the lockbox 100 may be directly coupled to structural element 170. In some such embodiments, the structural element 170 (e.g. car chassis) may include a stud or post (not shown) integrated therewith that proceeds all the way into and through an aperture 125 of lockbox 100. In some embodiments, the stud may pass entirely or partially through each of the other layers depicted in FIG. 3 (e.g. 140, 160, 150, 170, 200 and/or 300), and in other embodiments, one or more of the other layers will not be present between the vehicle structural component 170 and the lockbox 100, or between any one or more other elements shown in FIG. 3 (e.g. the other layers may be built around and not between such elements).

For example, in contrast to the particular embodiment depicted in FIG. 3, the ottoman 300 wall may not proceed all the way between slide rail 140 and lockbox 100. Thus, there may be direct contact between the lockbox 100 wall and slider rail 140. This provides just one example of how, in accordance with one or more embodiments of the present technology, one or more layers or elements may be built around instead of between the various elements depicted in FIG. 3. One of ordinary skill in the art will appreciate that other arrangements may be employed without departing from the spirit and scope of the present disclosure. It should be noted that, for purposes of this disclosure, reference to studs and posts may be interchangeable, i.e., a stud may be a post and a post may be a stud in some instances, and often they may be comprised of the same material and/or structure. For instance, both the studs and the posts as described herein may be threaded bolts of a particular size.

Referring back now to FIGS. 1-2, as depicted, accessing the enclosure of the lockbox 100 requires traversing a password/passcode-protected barrier 110. Barrier 110 may be a lid, a door, a gate, or other barrier (or arrangement of components) coupled to, operable with, or integrated with the lockbox 100, and restricting access thereto. The barrier 110 may open in any one or more directions. For example, although the lid is depicted in FIG. 1 as being hinged at a side of the lockbox 100 near a left side of the seat (when facing forward) and opening from a side of the lockbox 100 near a right side of the seat (when facing forward), the lid may be configured to open from any side or location (e.g. near the front side of the seat, near the back side of the seat, near a bottom of the seat, etc.). The same applies to the ottoman configuration 300. Further, although barrier 110 is depicted in FIGS. 1-2 as a lid opening in an upward direction, one of ordinary skill in the art will readily recognize that there are several other variations and/or modifications of such barriers that will fall within the scope of the present disclosure. For example, the ottoman itself may form one or more of the exterior walls of the lockbox (See FIG. 4A). In another example, the barrier may be created by a separate structural unit that can in some instances cover any openings in the enclosure that comprises the lockbox 100 (e.g. where the lockbox is configured like an openable drawer, and the barrier 110 may be the housing structure/receptacle surrounding an opening of the lockbox 100 enclosure when in a closed configuration (See FIGS. 4B and 4C).

Figure 4A:
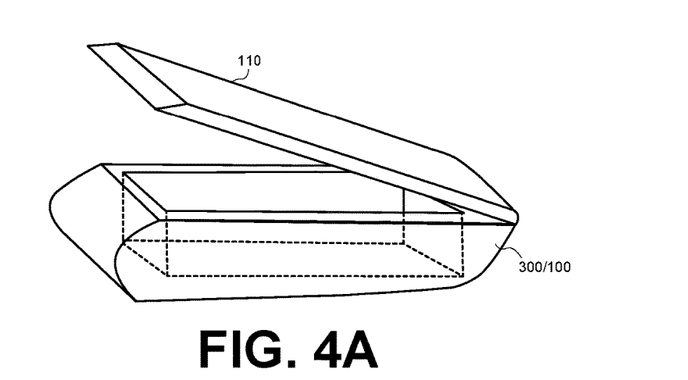
FIG. 4A illustrates an exemplary lockbox and ottoman component that may be employed in an exemplary in-vehicle locking safe system in accordance with one or more embodiments of the present disclosure.

FIG. 4A illustrates an exemplary lockbox and ottoman component that may be employed in an exemplary in-vehicle locking safe system in accordance with one or more embodiments of the present disclosure. As depicted the ottoman 300 itself may form one or more of the exterior walls of the lockbox 100. The barrier 110 is a lid operable to open and close as permitted by a locking mechanism (not shown). It should be noted that, although not shown, a car seat 200 may also serve as/form one or more of the exterior walls of the lockbox 100 in the same or similar manner as the ottoman 300 depicted in FIG. 4A.

Figure 4B:
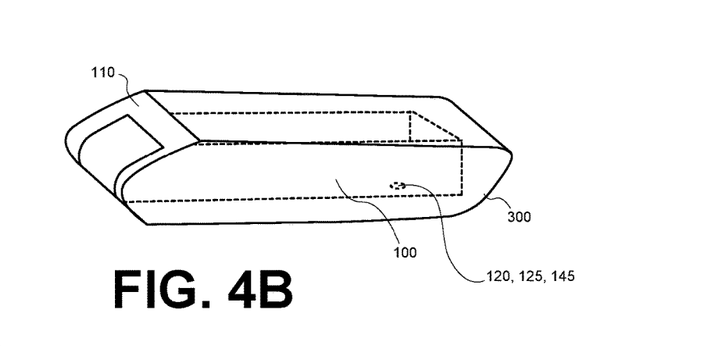
FIGS. 4B and 4C illustrate a first and second state of an exemplary lockbox and ottoman component that may be employed in an exemplary in-vehicle locking safe system in accordance with one or more embodiments of the present disclosure.
Figure 4C:
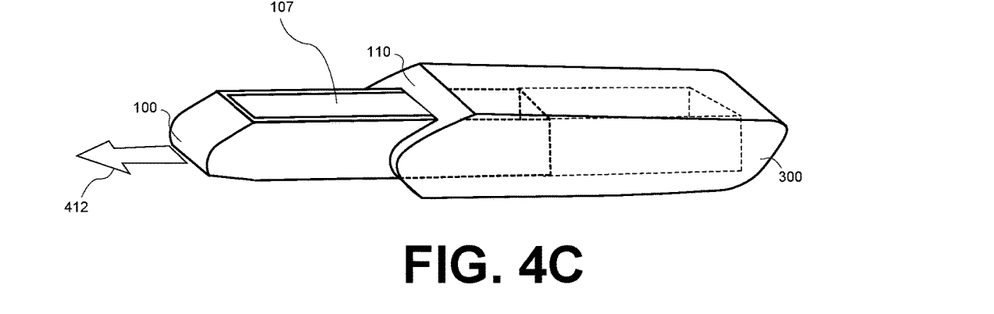

FIGS. 4B and 4C illustrate a first and second state of an exemplary lockbox and ottoman component that may be employed in an exemplary in-vehicle locking safe system in accordance with one or more embodiments of the present disclosure. As shown, the barrier 110 may be created by a separate structural unit (here, the top wall of ottoman 300) that can in some instances cover any opening 107 in the lockbox 100 enclosure (e.g. where the lockbox is configured like an openable drawer, and the barrier 110 may be the housing structure of the ottoman 300 surrounding an opening of the lockbox 100 enclosure when in a closed configuration. It should be noted that, although not shown, a car seat 200 may also serve as or form a barrier 110 to the opening 107 in lockbox 100, in the same or similar manner as the ottoman 300 depicted in FIG. 4A.

Figure 5A:
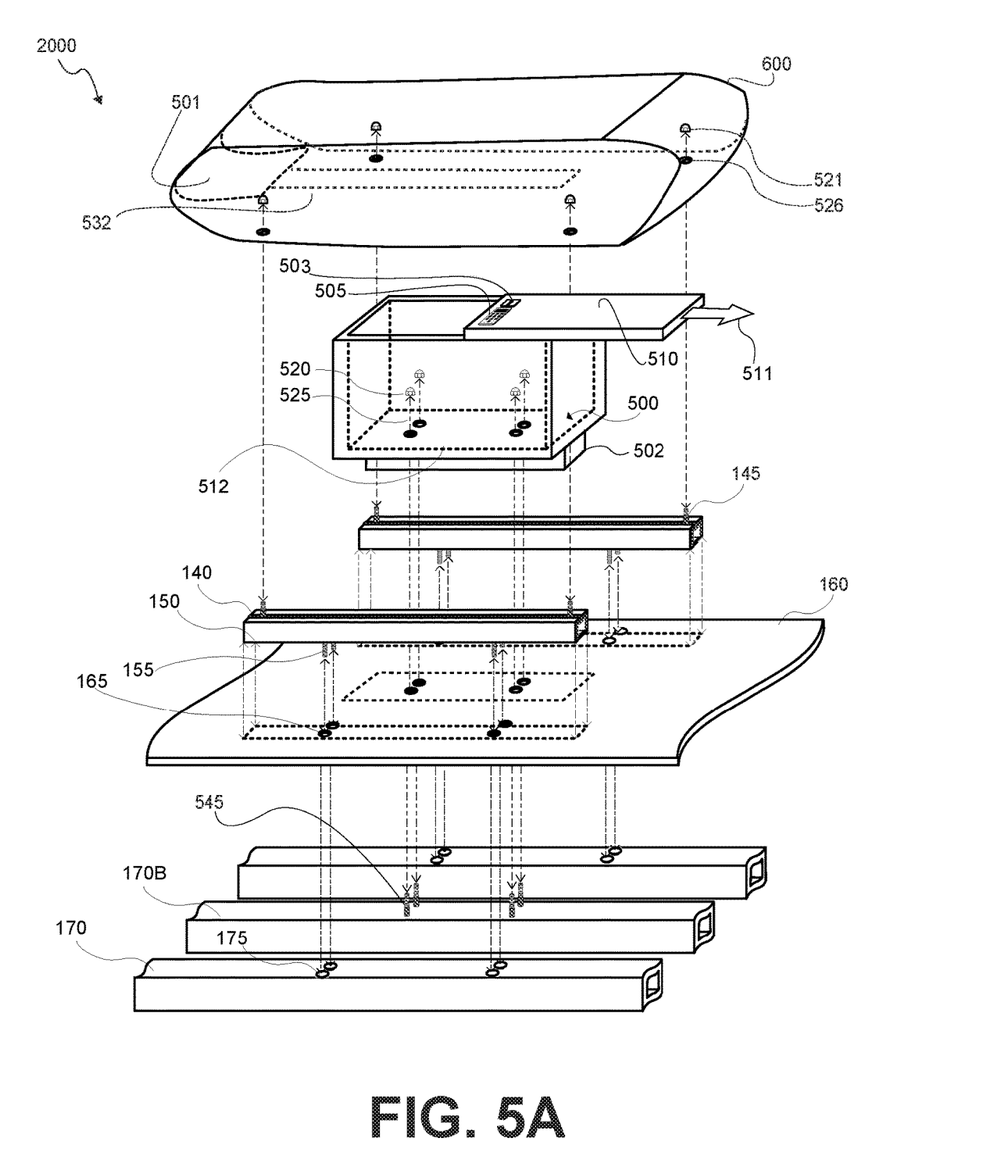
FIGS. 5A and 5B illustrate an exploded perspective and cross section view, respectively, of an exemplary in-vehicle locking safe system 2000 in accordance with one or more embodiments of the present disclosure.
Figure 5B:
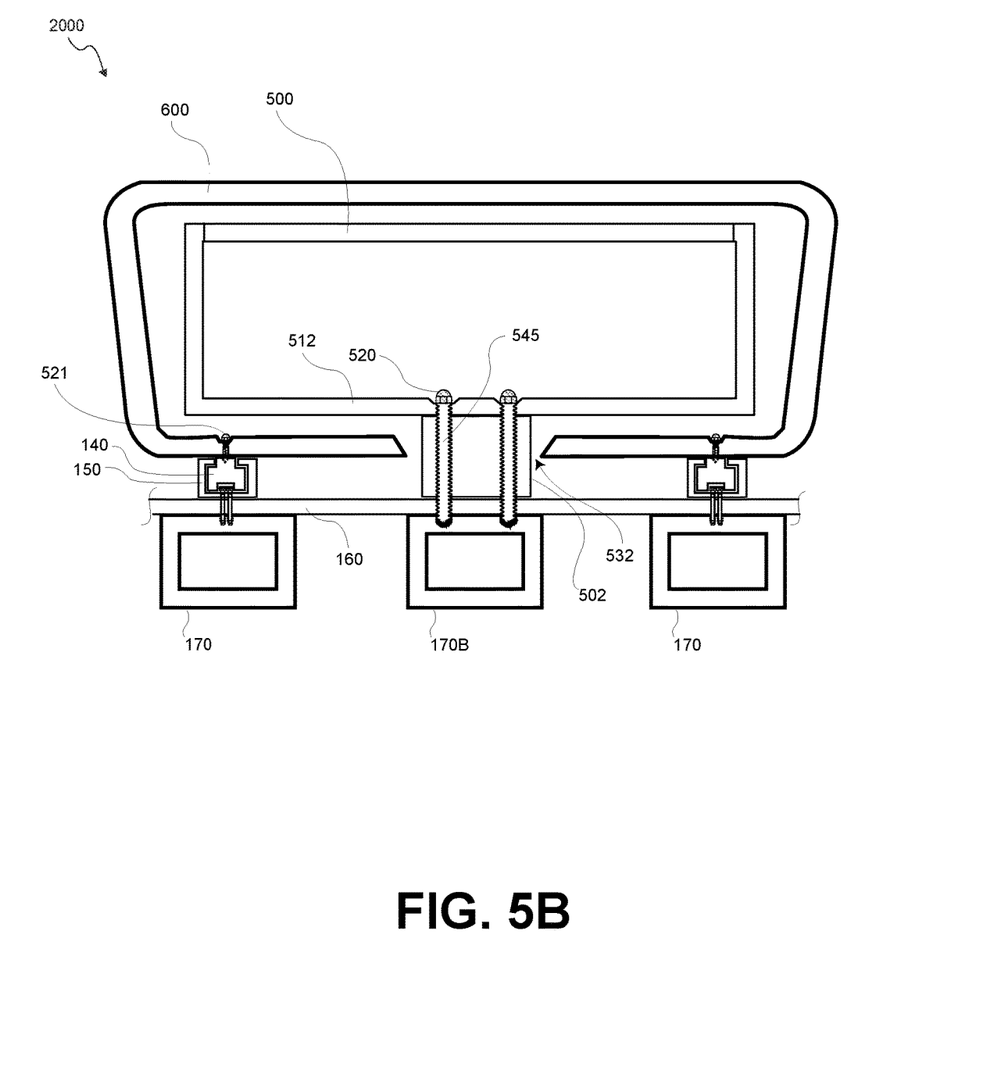

FIGS. 5A and 5B illustrate an exploded perspective view and cross section view, respectively, of an exemplary in-vehicle locking safe system 2000 in accordance with one or more embodiments of the present disclosure. The system 2000 may include two barriers to access. A first barrier may be formed by one or more walls of an ottoman 600, and a second barrier may be formed by one or more walls of lockbox 500. As will be described in more detail with reference to FIGS. 6A and 6B below, a user may choose to utilize the first and/or second barrier of access, depending on his or her preferences of convenience and security.

Referring to FIGS. 5A and 5B, in some embodiments, in-vehicle locking safe system 2000 may include a lockbox 500, which may be similar to lockbox 100 described with reference to FIGS. 1-4 above. In in-vehicle locking safe system 2000, lockbox 500 may be coupled to a vehicle structural element 170B (e.g., a chassis, floor, undercarriage element, etc.) via one or more fastening elements similar to those shown in FIGS. 1 and 2 (e.g., nut(s) 520, stud(s) 545. As depicted, lockbox 500 may include a base 502 directly coupled to a bottom wall 512 of the lockbox and running from the front to the rear of lockbox 500, where the width of base 502 is more narrow than that of bottom wall 512. The lockbox 500 may be configured with one or more aperture(s) 525 proceeding into or through one or more of its wall(s) (e.g. the bottom wall 512) or other support elements (e.g., base 502), and at least one end of the at least one fastening component(s) (e.g., as depicted, a threaded stud 545) may proceed into and/or pass through one or more of the aperture(s) to join and/or mate with a complementary fastening component/feature (e.g., as depicted, a complementarily threaded nut 520) within an enclosure of lockbox 500.

As depicted, stud 545 may be integrated with vehicle structural element 170B, and may proceed all the way into and through an aperture 125 of lockbox 100, thereby directly coupling lockbox 500 to vehicle structural element 170B. In some embodiments, the stud may pass entirely or partially through each of the other layers depicted in FIGS. 5A and 5B (e.g. base 502 and floor 160), and in other embodiments, one or more of the other layers will not be present between the vehicle structural component 170B and the lockbox 500, or between any one or more other elements shown in FIGS. 5A and 5B (e.g. the other layers may be built around and not between such elements).

The enclosure may be configured with a removable/moveable/openable barrier 510 (e.g., lid) configured to cover an opening of the enclosure, the removability/movability of such barrier providing the means of proper entry into the enclosure of the lockbox 500. As depicted, barrier 510 may comprise a sliding lid configured to move as indicated by arrow 511(e.g., along one or more tracks within lockbox 500), thereby allowing a user to access to the contents of the lockbox. As will be discussed in more detail with reference to FIGS. 6A and 6B below, barrier 510 may function to provide a second layer of security, with a barrier of ottoman 600 forming a first layer of security.

As with lockbox 100, lockbox 500 may include any type of safe or lockbox (including those commonly known in the art) having an enclosure configured to secure and hold valuables. As with lockbox 100 described above, the removability/movability of barrier 510 may provide the means of proper entry into the enclosure of the lockbox 500. Proper entry may, in some instances, include providing a unique password or passcode or other specified authentication information (e.g. fingerprint, retinal scan, etc.) to unlock the lock mechanism 503.

As depicted, ottoman 600 may be configured to slide along one or more slider tracks 150 (e.g., via one or more slider rails 140). A bottom wall 530 of ottoman 600 may include a slot 532 configured to allow lockbox to remain stationary within ottoman 600, while the ottoman moves along the slider tracks. Ottoman 600 may be coupled (either directly or indirectly) to slider rails 140. As depicted, a threaded stud 145 may extend from the one or more slider rails 140, proceed into and/or pass through one or more apertures 526 in ottoman wall 530 to join/mate with complimentary fastening components (e.g., as depicted, a complimentary threaded nut 521).

As depicted, lockbox 500 may be configured to be embedded/concealed within an interior portion of an in-vehicle ottoman unit 500, thus hiding the lockbox by disguising/concealing it within a common component of a car cabin (e.g. a passenger seat 200). The top, side, and front walls of ottoman 600 may surround lockbox 500 on five sides, with a moveable rear portion 501 of ottoman 600 forming a barrier on a sixth (rear) side, as will be discussed in more detail below. As shown most clearly in FIG. 5B, in some embodiments, when installed within ottoman 600, lockbox 500 can be positioned over the fastening components securing the ottoman to the slider rails 140 (e.g., stud(s) 145, and complementary threaded nut 521). Thus, fastening components of ottoman 600 (e.g., threaded nut 521) may only be accessed once the slider rails 140 are removed from slider tracks 150, thereby preventing easy removal of the ottoman.

One of ordinary skill in the art will appreciate that other arrangements and/or modifications may be employed without departing from the scope and spirit of the present disclosure, including all of the modifications discussed with reference to FIGS. 1-4 above.

As illustrated and explained, the in-vehicle locking safe system 2000 provides two barriers to the contents of lockbox 500. This concept is described further with reference to FIGS. 6A-6B below.

Figure 6A:
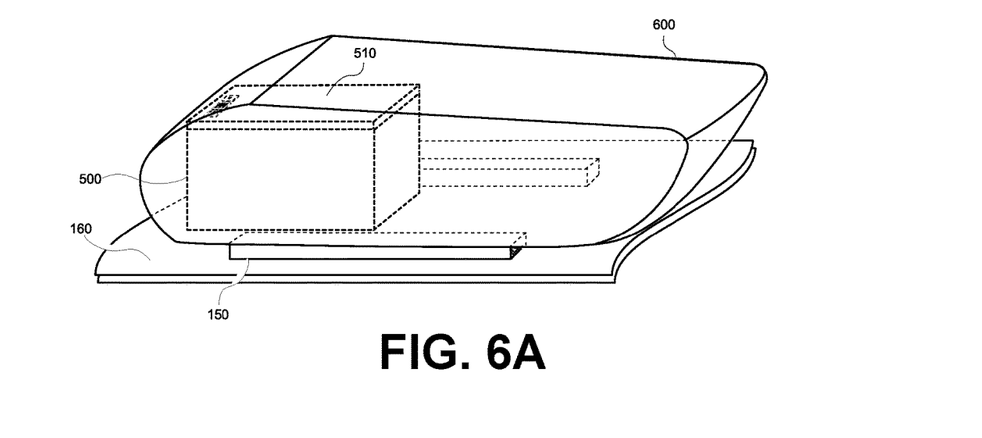
FIGS. 6A and 6B illustrate a first and second state of an exemplary lockbox and ottoman component that may be employed in an exemplary in-vehicle locking safe system in accordance with one or more embodiments of the present disclosure.
Figure 6B:
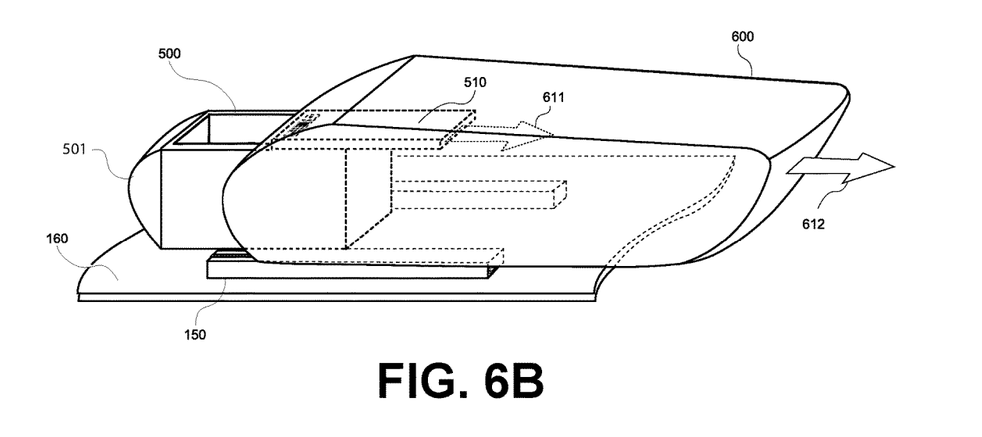

FIGS. 6A and 6B illustrate a first and second state of an exemplary lockbox and ottoman component (e.g., lockbox 500 and ottoman 600 described with reference to FIGS. 5A and 5B) that may be employed in an exemplary in-vehicle locking safe system in accordance with one or more embodiments of the present disclosure. In a first state shown in FIG. 6A, lockbox 500 is surrounding on each side by ottoman 600. Thus, the contents of lockbox 500 are protected from access by at least ottoman 600. In some cases, a user may wish to only utilize the protection of the ottoman 600 and not engage the locking system of lockbox 500. For examples, in cases where the user assess that the risk of a break-in is low, or in cases where the items within lockbox 500 are of lower value. This case (where the lockbox is unlocked, but the ottoman provides a barrier) is hereinafter referred to as "low security mode," in contrast to the case where the ottoman provides a barrier and the lockbox 500 lockbox is locked, which is hereinafter referred to as "high security mode."

FIG. 6B illustrates a second state of lockbox 500 and ottoman 600 wherein ottoman 600 has moved along slider tracks 150 in a forward direction, as indicated by arrow 612. As depicted, lockbox 500 and a moveable rear portion 501 of ottoman 600 remains stationary. In the configuration illustrated in FIG. 6B, as ottoman 600 moves forward, the lid 510 of lockbox 500 is also moved forward (e.g., is either pulled along with ottoman 600 or moved by some other means) as indicated by arrow 611, thereby opening lockbox 500. In low security mode, lockbox may be opened (e.g., lid 510 may be slid open) whenever ottoman 600 is moved sufficiently forward. In high security mode, lockbox 500 may be revealed when ottoman 600 is moved forward, but an additional authorization (e.g., passcode or key) is required to open lid 512 and access the contents of the lockbox.

In some configurations, the ottoman may be moved sufficiently forward only with proper authorization. For example, the ottoman may only move sufficiently forward when the presence of the vehicle owner is detected in the vehicle. In other configurations, the ottoman cannot be adjusted when the vehicle is turned off, thus preventing easy access to the contents of lockbox 500, even in low security mode.

In some configurations, ottoman 600, lockbox 500, and movable rear portion 501 can be designed such that the ottoman maintains a uniform appearance until the ottoman is moved sufficiently forward to reveal lockbox 500. For example, in some configurations not shown, moveable rear portion 501 may move forward and back in unison with ottoman 600, until the ottoman is moved beyond a threshold forward distance, at which point the moveable rear portion remains stationary with lockbox 500 and the rest of ottoman 600 shifts forward. In other embodiments not shown, moveable rear portion 501 may comprise the entire rear wall of ottoman 600, and a uniform appearance may be maintained, for example, using flexible or telescoping elements between the moveable rear portion 501 and the rest of ottoman 600.

Figure 7:
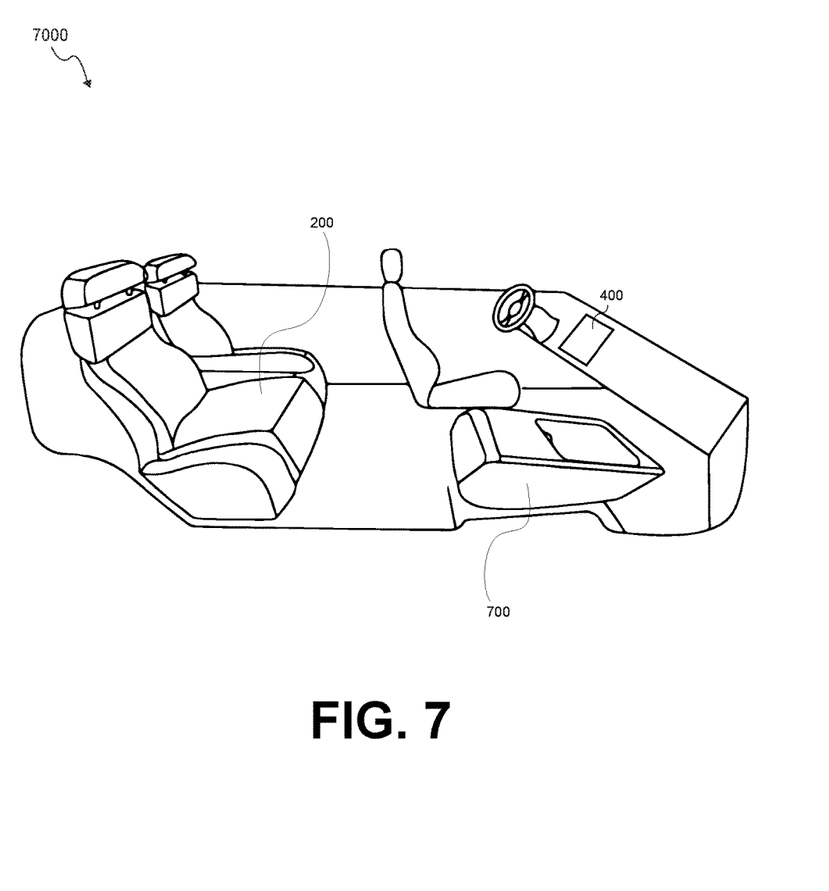
FIG. 7 depicts an exemplary car seat and ottoman that may be deployed in exemplary embodiments of the in-vehicle locking safe system, in accordance with one or more embodiments of the present disclosure.

FIG. 7 depicts an exemplary car seat and ottoman that may be deployed in exemplary embodiments of the in-vehicle locking safe system 7000 (e.g., system 1001 or 1002 discussed above), in accordance with one or more embodiments of the present disclosure. As shown, an ottoman 700 (e.g., ottoman 300 or 600 discussed above) may be situated in the area of a car cabin that is traditionally used for a passenger seat. A lockbox in accordance with one or more embodiments of the present disclosure may be situated/nested within a portion of the ottoman 700 (e.g. within an internal space inside of ottoman 700). Or, as described above, the walls of the ottoman 700 may double as the walls of the lockbox as described above with reference to FIGS. 4A-4C.

In other embodiments, a lockbox may be situated/nested within a portion of the car seat 200 (e.g. within an internal space inside of seat 200). Or, as described above, the framework/side walls of the car seat 200 base may double as the walls of the lockbox as described above with reference to FIGS. 4A-4C. In some other embodiments, the lockbox may be situated/nested in a central console of the vehicle. In further some other embodiments, the lockbox may be located in a glove compartment area of the vehicle.

As noted previously with reference to FIG. 1, the password and/or passcode protection mechanism (e.g. including lock 103) operatively coupled with lockbox 100 may include a digital padlock, a physical keyed lock, a combination lock, a mortise lock, an electronic lock, etc., and/or any other locking mechanism known in the art. Lock 103 may be any type or style of lock, and may be accessible in any acceptable manner. For example, the lock may be unlocked/made accessible by moving one or more dials into a particular configuration, selecting one or more numbers/letters in a specific pattern on an operatively coupled keypad (e.g. including physical and/or virtual keypads, connected through a hardware connection, a wired and/or wireless connection, and the like). For example, referring now to FIG. 7, the vehicle may include a computer system for controlling the vehicle, for example, a car panel computing device 400. The car panel computing device 400 may be operatively coupled (via a wired or wireless connection) with any one or more locking mechanisms 103 employed as part of the in-vehicle locking safe system 7000. Thus, to open the lockbox, a user may selectively enter or provide required authentication information (e.g. password, passcode, fingerprint, retinal scan) via one or more features of the car panel computing device 400 (e.g. a camera, a touch screen, a fingerprint scanner, etc.) and the car panel computing device 400 may send an instruction signal to the locking mechanisms 103 to unlock the lockbox 100. In some embodiments, a mobile computing device (not shown) may be used to provide the required authentication information to access the lockbox 100. And in some instances, multiple of the systems and methods described herein may be used in combination to open the lockbox. For example, to access the interior of the lockbox 100, a user may have to press a button on the lockbox requesting access, the car panel computing device 400 may then prompt the user to provide their index finger to the fingerprint scanner for authentication, once the fingerprint authentication has been validated, the car panel computing device may prompt the user to input a 2-step verification number it just texted to the appropriate user's phone. Any such 2-step, 3-step, or n-step verification and authentication methods may be employed, all of which are intended to fall within the scope of the present disclosure.

In some embodiments, the vehicle is equipped with one or more sensors, for example, camera, sound sensor, and/or other wireless detectors. The car panel computing device 400 includes software such as an image recognition software, a voice recognition software, to recognize the occupants in the vehicle, and may automatically open the lockbox 100 based on the recognized identification of the occupants, without receiving further instructions from the occupants. For another example, a wireless detector on the vehicle may detect a digital signature or other identification information from mobile communication devices that occupants carry, and the computing device 400 may determine the occupants' identities based on the digital signatures, and may automatically open the lockbox 100 based on the recognized identification of the occupants. In some other embodiments, a user may grant authorization or open the lockbox 100 remotely. For example, the computing device 400 may be connected with a network through wireless communication. The user may instruct the computing device 400 to open the lockbox 100 remotely through the network. After the computing device 400 verifies the identification and authorization of the user, the computing device 400 may open the lockbox 100 for occupants of the vehicle.

While various embodiments of the disclosed technology have been described above, it should be understood that they have been presented by way of example only, and not of limitation. Likewise, the various schematics and diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the terms "component" or "feature" or "element" do not imply that the components or functionality described or claimed in connection therewith are all configured in a common package or as a single unit. Indeed, any or all of the various components, features, and elements, whether control logic or other physical components, can be combined as a single unit or separately provided.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

The invention claimed is:

1. An in-vehicle locking safe system comprising:
a lockbox having one or more walls defining an enclosure, wherein one of the walls includes one or more apertures, one of the walls defines a barrier, and the lockbox includes a lock for securing the barrier;
a vehicle interior element;
a vehicle structural element;
one or more studs connecting the vehicle structural element with the lockbox to secure the lockbox to the vehicle structural element, each of the one or more studs having a first end extending into the enclosure through the aperture and a second end attached to the vehicle structure element, the first end being secured at a location inside the enclosure of the lockbox by one or more fasteners;
wherein the vehicle structural element includes a slider rail coupled to a slider track, the lockbox is positioned within the vehicle interior element, and the lockbox and the vehicle interior element are configured to move in unison along the slider track.

2. An in-vehicle locking safe system comprising:
a lockbox having one or more walls defining an enclosure, wherein one of the walls includes one or more apertures, one of the walls defines a barrier, and the lockbox includes a lock for securing the barrier;
a vehicle interior element;
a vehicle structural element including a vehicle chassis component;
one or more studs connecting the vehicle structural element with the lockbox to secure the lockbox to the vehicle structural element, each of the one or more studs having a first end extending into the enclosure through the aperture and a second end attached to the vehicle structure element, the first end being secured at a location inside the enclosure of the lockbox by one or more fasteners.

3. The in-vehicle locking safe system of claim 2 further comprising a slider rail coupled to a slider track, wherein the vehicle interior element is coupled to the slider rail, and the vehicle interior element is configured to move between a first position along the slider track and a second position along the slider track.

4. The in-vehicle locking safe system of claim 3, wherein a lower portion of the lockbox is configured to remain stationary as the interior element moves along the slider track.

5. The in-vehicle locking safe system of claim 4, wherein a lid of the lockbox and the lower portion of the lockbox is hidden by the vehicle interior element when the vehicle interior element is in the first position, and at least the lower portion of the lockbox is visible when the vehicle interior element is in the second position.

6. The in-vehicle locking safe system of claim 5 wherein, in the event that the lock is not locked, the lid of the lockbox is automatically moved when the vehicle interior element is moved from the first position to the second position.

7. The in-vehicle locking safe mechanism of claim 6, wherein, in the event that the lock is not locked, the lid of the lockbox is hidden by the interior vehicle element when the vehicle interior element is in the second position.

8. The in-vehicle locking safe mechanism of claim 6, wherein, in the event that the lock is not locked, the lid of the lockbox is moved in a direction and speed equal to a direction and speed of the vehicle interior element as the vehicle interior element is moved from the first position to the second position.

9. The in-vehicle locking safe mechanism of claim 6, wherein, in the event that the lock is locked, the lid of the lockbox is visible when the vehicle interior element is in the second position.

10. The in-vehicle locking safe system of claim 1, wherein the second end of the one or more studs is integrally formed with the vehicle structural element.

11. The in-vehicle locking safe system of claim 1, wherein the one or more fasteners are accessible only through the inside of the enclosure.

12. The in-vehicle locking safe system of claim 1, wherein the lock can be unlocked by an authentication mechanism including at least one of the following: a password, a biometric scan, or an instruction signal from the vehicle.

13. The in-vehicle locking safe system of claim 1, wherein the lock is connected to a computer system of the vehicle, and wherein the lock can be unlocked by an instruction signal from the computer system.

14. The in-vehicle locking safe system of claim 1, wherein the vehicle interior element is a vehicle seat.

15. The in-vehicle locking safe system of claim 1, wherein the vehicle interior element is a vehicle ottoman.

16. An in-vehicle locking safe system comprising:
a lockbox including a front side, rear side, left side, right side, bottom side, a lid, and a lock for securing the lid;
a vehicle structural element coupled to the bottom side of the lockbox;
a vehicle interior element;
a slider rail coupled to the vehicle interior element and configured to move the vehicle interior element from a first position to a second position along a slider track;
wherein the vehicle interior element surrounds the lockbox on at least the front side, left side, and right side when the vehicle interior element is in a first position.

17. The in-vehicle locking safe system of claim 16, wherein the vehicle interior element does not surround the lockbox on at least the front side, left side, and right side when the vehicle interior element is in a second position.

18. The in-vehicle locking safe system of claim 17, wherein the vehicle interior element surrounds a portion of the bottom side of the lockbox when the vehicle interior element is in the first position.

\* \* \* \* \*